United States Patent

Chao

[11] Patent Number: 5,896,712
[45] Date of Patent: Apr. 27, 1999

[54] LIGHT-COLLECTING SKYLIGHT COVER

[75] Inventor: Bing-Ling Chao, San Diego, Calif.

[73] Assignee: Solatube International, Inc., Carlsbad, Calif.

[21] Appl. No.: 08/957,513

[22] Filed: Oct. 24, 1997

[51] Int. Cl.⁶ .......................... E04D 13/03; G02B 17/00
[52] U.S. Cl. ............................................ 52/200; 359/591
[58] Field of Search .................................. 52/200, 171.3

[56] References Cited

U.S. PATENT DOCUMENTS

| | | | |
|---|---|---|---|
| D. 382,347 | 8/1997 | Grubb | D25/52 |
| 4,839,781 | 6/1989 | Barnes et al. | 362/299 |
| 5,099,622 | 3/1992 | Sutton | 52/200 |
| 5,467,564 | 11/1995 | DeKeyser et al. | 52/173.3 |
| 5,493,824 | 2/1996 | Webster et al. | 52/200 |
| 5,502,935 | 4/1996 | Demmer | 52/200 |
| 5,546,712 | 8/1996 | Bixby | 52/200 |
| 5,596,848 | 1/1997 | Lynch | 52/200 |
| 5,648,873 | 7/1997 | Jaster et al. | 359/591 |
| 5,655,339 | 8/1997 | DeBlock et al. | 52/200 |

Primary Examiner—Carl D. Friedman
Assistant Examiner—Dennis L. Dorsey
Attorney, Agent, or Firm—John L. Rogitz

[57] ABSTRACT

A roof-mounted cover for a tubular skylight includes a dome and a frusto-conical skirt depending downwardly from the dome. The skirt defines an open circular periphery, and plural circular grooves are formed on the inside surface of the skirt parallel to the periphery. The grooves direct light into a vertical reflecting tube that is in communication with the cover, and the light propagates downwardly through the tube and through a ceiling-mounted light diffuser to illuminate an interior room of the building on which the cover is mounted.

8 Claims, 1 Drawing Sheet

LIGHT-COLLECTING SKYLIGHT COVER

FIELD OF THE INVENTION

The present invention relates generally to skylights for buildings, and more particularly to skylights which efficiently collect light for directing the light into a room in the interior of a building.

BACKGROUND

Skylights are used to illuminate interior rooms of buildings pleasantly and energy efficiently. Typically, a tubular skylight includes a transparent cover mounted on a roof of a building, and the cover is connected via an internally reflective tube to a diffuser mounted on the interior ceiling of the room to be lighted. With this structure, light entering the cover on the roof can propagate downwardly through the tube and out of the diffuser to illuminate the room.

To increase the amount of light that is directed into a room from a roof-mounted cover, U.S. Pat. No. 5,099,622, assigned to the same assignee as is the present invention, discloses a transparent dome-shaped roof cover having a reflector mounted therein. The reflector redirects into the tube light that otherwise would not be directed into the tube, to thereby increase the amount of light that is directed into the interior room. The '622 invention has been commercially successful.

In contrast to the above-noted commercially successful '622 patented device, U.S. Pat. No. 5,655,339 teaches a roof-mounted hemispherical dome that does not have a reflector located inside the dome, but rather has longitudinal grooves formed in the outer surface of the dome along great circles that pass through the apex of the dome. As taught in the '339 patent, the grooves internally reflect light to redirect light into an internally reflective tube and thence into an interior room to be lighted. As recognized by the present invention, however, the '339 patented invention only inefficiently redirects light into the tube, and thus does not increase the amount of light that is directed into the room as effectively as might be hoped.

Furthermore, the '339 dome is a hemisphere. Consequently, like other skylight domes, the '339 dome presents a rather high profile above a roofline. Another example of a high profile dome is disclosed in U.S. Pat. No. 5,648,873, wherein the dome must have a relatively high profile to enclose a pyramidal prism. Indeed, the ratio of the height to the base of the '873 dome is about 0.67. In some applications, particularly in residential applications, it is not desirable, for aesthetic reasons, to incorporate high profile structure into rooflines.

The present invention, however, recognizes that it is possible to provide a skylight dome that includes a reflector for directing light into a skylight tube while avoiding blocking light and while presenting a comparatively low profile on a roofline. Accordingly, it is an object of the present invention to provide a skylight dome that includes a reflector for directing light into a skylight tube. Another object of the present invention is to provide a skylight dome that directs a relatively large amount of light into an interior room of a building. Still another object of the present invention is to provide a skylight dome with reflector that does not block light from entering a tube in light communication with the dome, but instead efficiently directs light into the tube. Yet another object of the present invention is to provide a skylight dome that is easy to use and cost effective to manufacture. Another object of the present invention is to provide a skylight that directs a relatively large amount of light into an interior room of a building and that is aesthetically pleasing to the eye.

SUMMARY OF THE INVENTION

A skylight cover includes a body that defines an apex and a periphery opposed to the apex. The body includes a light redirecting portion between the apex and the periphery to direct light impinging on the redirecting portion generally away from the apex. As disclosed in detail below, the light redirecting portion is established at least in part by one or more grooves on the body, with each groove throughout its length being parallel to the periphery.

In a preferred embodiment, the body defines a dome portion and a skirt between the dome portion and the periphery. The dome portion is characterized by a spherical radius of curvature, whereas the skirt is characterized by a frusto-conical shape. The periphery defines a plane, and the skirt preferably defines an angle relative to the plane of between fifty and eighty five degrees, and more preferably between fifty and seventy five degrees.

With regard to the preferred grooves, each groove defines a stepped cross-section. Preferably, the grooves are formed on the inside surface of the skirt. To configure the grooves to direct light downwardly, each groove includes a step and a wall, with the step being shorter than the wall. In accordance with the present invention, the step of a groove extends toward the outer surface of the skirt relative to the wall of the immediately higher groove. If desired, a circular connecting flange extends from the skirt for attaching the cover to a roof flashing.

In another aspect, a cover for a skylight that includes a ceiling-mounted light diffuser includes a body having a low profile ratio as defined herein. The body is mountable on a roof above the ceiling, and the body has plural grooves configured for directing light toward the light diffuser when the body is mounted on the roof.

In yet another aspect, a method is disclosed for lighting a room that is interior to a building having a roof and a ceiling below the roof. The present method includes providing a skylight cover on the roof. As intended by the present invention, the cover includes a transparent light redirecting portion that extends substantially completely around the cover. The light redirecting portion is configured to redirect, vertically downwardly, light propagating horizontally when the light impinges on the redirecting portion.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
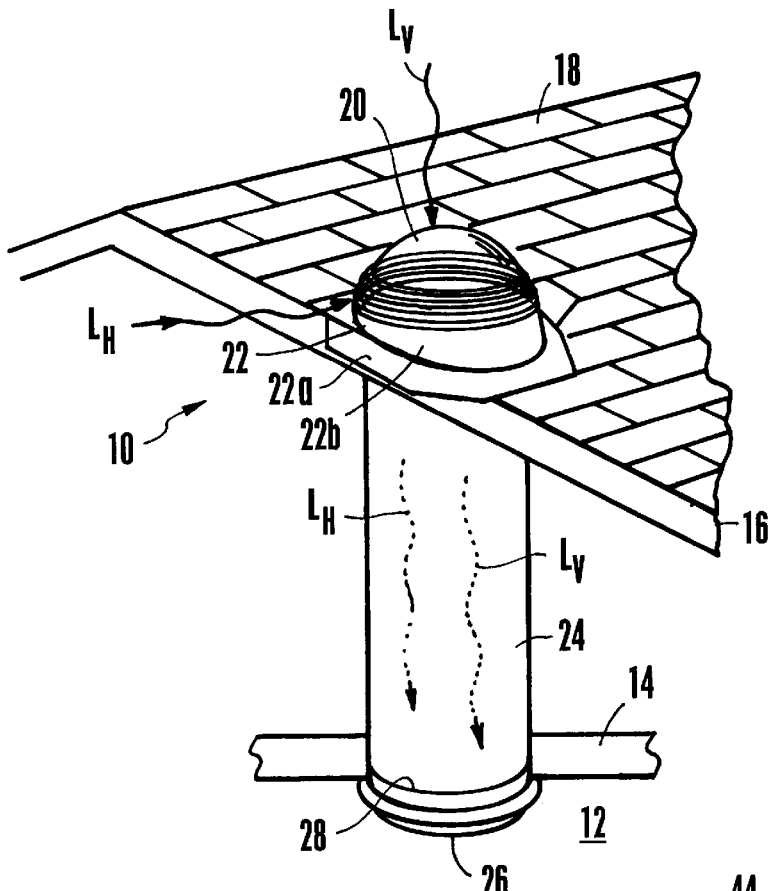
FIG. 1 is a perspective view of the skylight cover of the present invention, shown in cooperation with a skylight tube and light diffuser on a building, with portions of the building broken away.

Referring initially to FIG. 1, a skylight is shown, generally designated 10, for lighting, with natural sunlight, an interior room 12 having a ceiling 14 in a building 16 having a roof 18. As shown, the skylight 10 includes the inventive roof-mounted cover 20 of the present invention, discussed in detail below in reference to FIGS. 2 and 3.

The cover 20 is mounted to the roof 18 by means of a flashing 22. More specifically, the flashing 22 includes a flange 22a that is attached to the roof 18 by means well-known in the art, and a curb 22b rises upwardly from the flange 22a and is angled as appropriate for the cant of the roof 18 to engage and hold the cover 20 in the generally vertically upright orientation shown.

Figure 2:
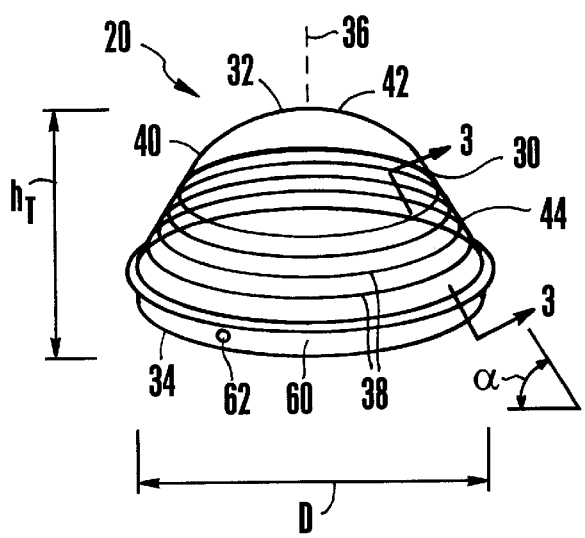
FIG. 2 is a perspective view of the skylight cover.

As further shown in FIG. 2, a light tube 24 is connected to the flashing 22. The light tube 24 extends through the ceiling 14 of the interior room 12. Per the present invention, the tube 24 directs light that enters the tube 24 downwardly to a light diffuser 26, in the room 12. Accordingly, the inside of the tube 24 is reflective. The tube 24 can be made of a metal such as a type 1150 alloy aluminum, or the tube 24 can be made of fiber or plastic or other appropriate material, with the interior of the tube 24 being rendered reflective by means of, e.g., electroplating, anodizing, metalized plastic film coating, or other suitable means.

As mentioned above, the tube 24 terminates in the light diffuser 26. In one preferred embodiment, the light diffuser 26, tube 24, and flashing 22 are made by the present assignee.

As intended by the present invention, the light diffuser 26 is connected to the tube 24 by means well-known in the art. For example, a seal ring 28 can be surroundingly engaged with the tube 24 and connected to the light diffuser 26 to thereby hold the light diffuser 26 onto the tube 24.

Figure 3:
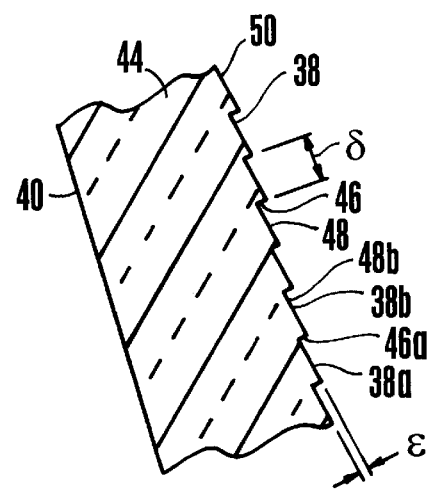
FIG. 3 is a cross-sectional view, as seen along the line 3—3 in FIG. 2.

Now referring to FIGS. 2 and 3, the details of the present cover 20 can be seen. Preferably, the cover 20 is optically transmissive, and more preferably is transparent. Additionally, as intended by the present invention the cover 20 is sufficiently strong and rigid to withstand inclement weather conditions when it is mounted on the building 16. In one preferred embodiment, the cover 20 is made of Lexan 143 polycarbonate marketed by General Electric Corp., although other materials, e.g., acrylic, polyethylene, Perspex™, and glass can be used. Preferably, the cover 20 is made by injection molding, and manufacturing techniques other than injection molding, e.g., vacuum forming or machining, can be used.

As shown in FIG. 2, the cover 20 includes a body 30, and the body 30 defines an apex 32 and a generally circular periphery 34 that is opposed to the apex 32. A vertical axis 36 is defined by a line passing through the apex 32 perpendicular to the plane of the periphery 34, it being understood that the axis 36 is generally vertical when the cover 20 is oriented on the roof 18 as intended and shown in FIG. 1.

In accordance with the present invention, the body 30 includes a light redirecting portion that is located between the apex 32 and the periphery 34 to direct light "$L_H$" (FIG. 1) impinging more or less horizontally on the redirecting portion generally away from the apex 32 and toward the periphery 34. In the embodiment shown in FIGS. 2 and 3, the light redirecting portion is established by plural grooves 38 that are formed on the body 30. Details of the grooves 38 are discussed further below in reference to FIGS. 3 and 4.

With further regard to the inventive features of the cover 20, the body 30 defines a smooth outer wall 40, a dome 42, and a skirt 44 that is between the dome 42 and the periphery 34. As shown in FIG. 2, the grooves 38 are formed on the inside surface of the skirt 44. Per the present invention, the dome 42 is characterized by a spherical radius of curvature, whereas the skirt 44 is characterized by a frusto-conical shape. In reference to FIG. 2, the periphery 34 lies in the horizontal plane relative to the vertical axis 36, and the skirt 44 defines an angle α with the horizontal plane of between fifty and eighty five degrees (50°–85°), and more preferably between fifty and seventy five degrees (50°–75°). As used herein, a skylight cover having a "low profile angle" is a cover in which the angle α is less than seventy nine degrees (79°). In one presently preferred embodiment, the angle α is seventy degrees (70°).

Thus, per present principles, the profile of the cover 20 is relatively low on the roof 18. Further to this end and owing to the cooperation of structure of the present cover 20 with grooves 38, the vertical height $h_T$ of the cover 20 from the center of the periphery 34 to the apex 32 is about six inches (6"), and the diameter "D" of the periphery 34 is about fourteen and six-tenths inches (14.6"). Thus, the ratio of the vertical height $h_T$ of the body 30 to the largest diameter "D" of the body 30 is about 0.41. As used herein, a skylight cover having a "low profile ratio" is a cover in which the ratio of the vertical height of the cover to the diameter of the base of the cover is less than 0.49. It is to be understood that while the preferred embodiment of the present invention advantageously provides a skylight cover 20 having a low profile as defined above, the skirt 44 could extend relatively high above the roof 18 (FIG. 1) if desired.

As can be appreciated in reference to FIGS. 2 and 3, the grooves 38 are circular along their length and are step-shaped in transverse cross-section, and each groove 38 throughout its length is parallel to the periphery 34. Thus, the grooves 38 and, hence, the light redirecting portion of the present invention, extends substantially completely around the cover 20.

With particular regard to FIG. 3, each groove 38 includes a generally horizontally-oriented step 46 and a generally vertically-oriented wall 48 depending downwardly from the step 46, with the grooves 38 being formed in an inner wall 50 of the skirt 44. The grooves 38 establish a Fresnel lens for redirecting light. It is to be understood that the steps 46 need not be exactly horizontal and that the walls 48 need not be exactly vertical; in the more general sense, the steps 46 of the grooves of the present invention face generally downwardly, and the walls 48 face generally laterally, when the invention is positioned on the building as intended. Preferably, the steps 46 are shorter than the walls 48. Indeed, in the preferred embodiment, the spacing δ between adjacent grooves 38 (i.e., the approximate length of each wall 48) is constant, and is equal to thirty three thousandths of an inch (0.033"). On the other hand, the width ε of each horizontal step 46 in the preferred embodiment is equal to nine thousandths of an inch (0.009").

The cooperation between the steps 46 and walls 48 of adjacent grooves 38 defines how the light will be bent by the light redirecting portion. In the preferred embodiment, to ensure that light propagating through the grooves 38 is bent downwardly into the tube 24 shown in FIG. 1 and not upwardly away from the tube 24, the step 46a of a first groove 38a extends toward, not away from, the outer wall 40 relative to the wall 48b of a second groove 38b that is immediately above the first groove 38a. From another aspect, the stepped grooves 38 establish a ratchet surface, with the direction of ratchet slippage being away from the apex 32, not toward the apex 32.

With the above-described combination of structure, the light redirecting portion of the present invention redirects light "$L_H$" (FIG. 1) propagating generally horizontally about ninety degrees (90°) downwardly, such that horizontally-propagating light is thus redirected through the tube 24, light diffuser 26, and into the interior room 12 of the building 16. Stated differently, the present invention redirects light into the room 12 that otherwise would not enter the room 12, to thereby increase the amount of light entering the room 12, while providing a skylight cover that advantageously is characterized by a low profile ratio.

Moreover, it will be appreciated that light "$L_v$" (FIG. 1) impinging vertically downwardly onto the cover 20 is not impeded by the light redirecting portion, but instead propagates directly through the dome 42 of the transparent cover 20 to the light diffuser 26. Still further, the light redirecting portion of the present invention, being transparent, does not block light, in contrast to an opaque reflector which reflects light impinging on one side of the reflector while blocking light impinging on the opposite side. Consequently, with the present cover 20, a relatively large amount of light enters the room 12 through the skylight 10.

Figure 4:
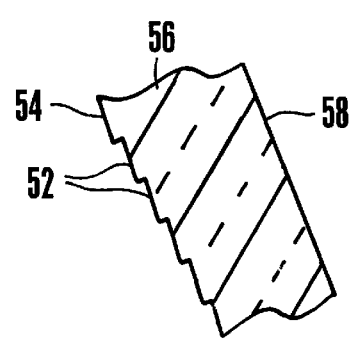
FIG. 4 is a cross-sectional view of an alternate embodiment in which the grooves are formed on the outside surface of the cover, as would be seen along the line 3—3 in FIG. 2.

It is to be understood that if desired, as shown in FIG. 4 grooves 52 can be formed on an outside surface 54 of a body 56 instead of the inside surface of the body. The body 56 shown in FIG. 4 is in all other substantial respects identical to the body 30 shown in FIGS. 1–3, with the proviso that, analogous to the grooves 38 shown in FIGS. 2 and 3, the horizontal steps of the grooves 52 in the outside surface 54 extend toward, not away from, an inner surface 58 of the body 56, relative to the immediately higher vertical wall.

Returning to FIG. 2 and completing the description of the cover 20, a ring-shaped connecting flange 60 extends downwardly from the skirt 44. In the preferred embodiment, the connecting flange 60 defines the periphery 34. Plural connector holes 62 are formed through the connecting flange 60, and connectors (not shown) extend through the holes 62 and are engaged with the flashing 22 (FIG. 1) to hold the cover 20 onto the flashing 22.

While the particular LIGHT-COLLECTING SKYLIGHT COVER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A skylight cover, comprising:
   a body defining an apex and a periphery opposed to the apex, the body including a light redirecting portion between the apex and the periphery to direct light impinging on the redirecting portion generally away from the apex, the light redirecting portion being established at least in part by one or more grooves on the body, each groove throughout its length being parallel to the periphery.

2. The skylight cover of claim 1 wherein the body defines an inside surface and the grooves are formed on the inside surface.

3. The skylight cover of claim 1, wherein the body defines a dome portion and a skirt between the dome portion and the periphery.

4. The skylight cover of claim 3, wherein the dome portion is characterized by a spherical radius of curvature.

5. The skylight cover of claim 4, further comprising a circular connecting flange extending from the skirt and defining the periphery.

6. The skylight cover of claim 3, wherein the skirt is characterized by a frusto-conical shape and wherein the periphery defines a plane, and the skirt defines an angle relative to the plane of between fifty and seventy five degrees.

7. The skylight cover of claim 1, wherein each groove defines a stepped cross-section.

8. The skylight cover of claim 7, wherein the body defines a first surface and a second surface opposed to the first surface, wherein the grooves are formed on the first surface, and wherein each groove includes a step and a wall, a step of a first groove extending toward the second surface relative to a wall of a second groove, the second groove being closer to the apex than the first groove.

* * * * *